June 28, 1955     W. G. BUEHNE     2,712,052
WATER HEATER
Filed May 27, 1953
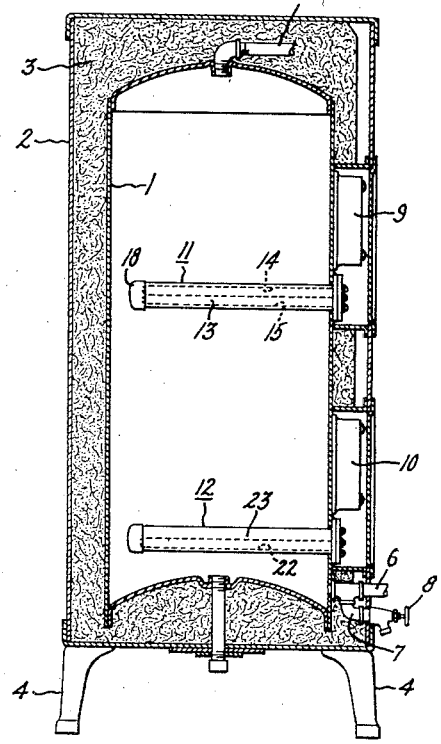
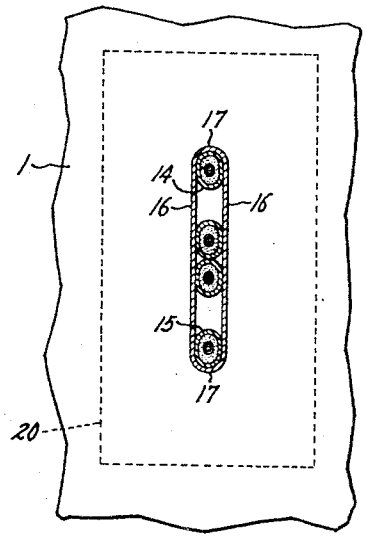
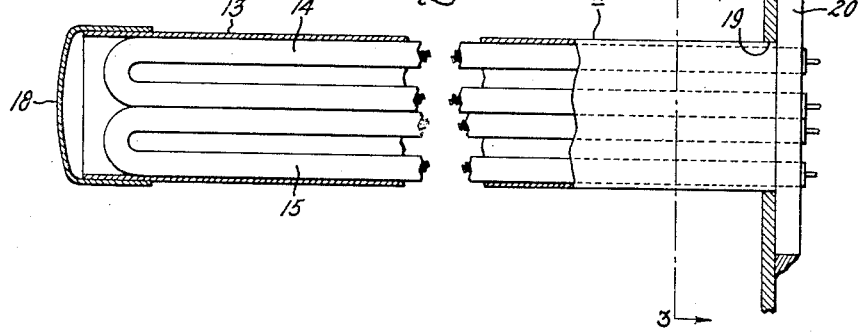
Inventor:
Willis G. Buehne,
by *Sheridan L. Bepps*
His Attorney.

United States Patent Office 2,712,052
Patented June 28, 1955

2,712,052

WATER HEATER

Willis G. Buehne, Louisville, Ky., assignor to General Electric Company, a corporation of New York Application May 27, 1953, Serial No. 357,814

7 Claims. (Cl. 219—38)

This invention relates to electric water heaters and has as its principal object the provision of a water heater in which the heating elements extend into the tank in intimate heat transfer relation with the water, but are nevertheless shielded from actual contact with the water and may be removed and replaced without draining the tank.

Another object of my invention is to provide a water heater in which interchangeable heating elements of various sizes and heating capacities may be easily and quickly inserted into or removed from the tank.

Another object of my invention is to provide a water heater in which a major portion of the heat transfer surfaces in contact with the water is vertically disposed so as to lengthen the period during which the upwardly moving heated water remains in contact with the heat transfer surfaces.

Further objects and advantages of my invention will become apparent as the following description proceeds and the features of novelty which characterize my invention will be pointed out with particularity in the claims annexed to and forming a part of this specification.

Briefly stated in accordance with one aspect of my invention, I provide a water heater tank in which thin-walled flexible tubes are mounted in fluid tight relationship with the tank wall so as to provide a shielded mounting space for electric heating elements which, when inserted in the tubes are nevertheless in intimate heat transfer relation with the water in the tank. The heating elements which may be of the elongated sheathed type fit snugly in the tubes in which they are mounted, the side walls of the tubes being flexible so that they are forced into intimate heat transfer relationship with the heating elements by the pressure exerted by the water in the tank. Preferably the tubes are arranged to accommodate either one or two heating elements.

For a better understanding of my invention reference may be made to the accompanying drawing in which:

Fig. 1 is an elevation view in section of a water heater embodying my invention.

Fig. 2 is an enlarged elevation view partly in section of a portion of the water heater assembly illustrated in Fig. 1.

Fig. 3 is a cross-sectional view taken along the lines 3—3 of Fig. 2.

Referring to the drawing my invention in one form comprises a suitable metallic water storage tank 1 which is provided with a suitable outer enclosing metallic casing 2. As shown, the top, bottom and side walls of the tank 1 are surrounded with suitable heat insulating material 3 such as rock wool. Preferably the tank 1 is supported in proper spaced relation with respect to outer casing 2 by supporting blocks (not shown) formed from suitable material having a low thermal conductivity. The casing 2 together with the storage tank 1 is supported in an upright position upon suitable legs 4. A hot water outlet pipe 5 communicates with the top of storage tank 1 and a suitable inlet pipe 6 for cold water is located at the bottom of the tank so that the cold water will be delivered to the tank at a point very close to its bottom wall. A suitable outlet pipe 7 provided with a valve 8 connects with the cold water pipe 6 so that the tank may be drained. Suitable temperature responsive control means are provided to control the heat input to the water in tank 1 and to regulate the temperature thereof. In the form shown in the drawing the means include a thermostat 9 responsive to water temperature in the upper portion of tank 1 and a thermostat 10 responsive to water temperature in the lower portion of the tank. Thermostats 9 and 10 are electrically connected to electric heating unit assemblies 11 and 12 so as to control the supply of electrical energy to these assemblies. One suitable control circuit arrangement which may be utilized is disclosed in Patent 1,892,577 granted December 27, 1932, to F. H. McCormick.

As shown in Figs. 2 and 3 of the drawing electrical heating unit assembly 11 includes a thin-walled tube 13 of generally retangular cross section in which suitable electric heating elements may be removably mounted. In the illustrated embodiment of my invention tube 13 is arranged to accommodate a pair of U-shaped elongated sheathed electric heating elements 14, 15 lying in the same plane with one leg of each element in mutual contact. However, those skilled in the art will understand that other types of unitary heating elements may be employed, the primary requirements being that the heating wires of the element be spaced or insulated from the walls of tube 13 when mounted therein and that the element have sufficient structural strength to withstand compression resulting from pressure in tank 1. Tube 13 includes a pair of vertically disposed side walls 16 spaced so as to provide a snug fit for heating elements 14 and 15, and connected by a pair of curved wall portions 17 which preferably have a curvature substantially equal to the curvature of the sheath of heating elements 14 and 15. To insure maximum heat transfer between elements 14, 15 and the water surrounding tube 13, side walls 16 are thin and flexible so that they are forced into intimate heat transfer relationship with the heating elements by the pressure exerted by the surrounding water. And for the same reason curved wall portions 17 are preferably spaced from each other a distance sufficient to provide a snug fit for a pair of heating elements supported as shown in Fig. 3. The inner end of tube 13 is closed and sealed by suitable means such as end cap 18. The outer open end of tube 13 extends through an opening 19 in tank 1 and is supported on the tank by means of a suitable fluid type joint which may include a flange 20 integral with walls 16, 17 and secured to the adjacent portions of the tank wall by any suitable means such as weld 21.

The preceding detailed description of heating assembly 11 is equally applicable to heating assembly 12, the latter including substantially the same elements as the former. While only one heating element 22 is diagrammatically illustrated as being mounted in tube 23, it, like tube 13, is arranged to accommodate either one or two heating elements. Obviously only one heating assembly rather than two as illustrated in Fig. 1 might be necessary or desirable in some applications.

From the preceding description it will be seen that I have provided a novel heating unit arrangement which retains the advantages of both the immersion type heater and the tank wall type heater. By permanently mounting tubes 13 and 23 so that they extend into tank 1 heating elements may be easily and quickly inserted or removed without the necessity of draining the tank or incurring the sealing difficulties usually encountered when immersion type units are removed or replaced. To remove a heating element it is only necessary to relieve the pressure in the tank (by closing the water inlet valve and opening a tap in the outlet line) so as to reduce frictional force between the element and the tube walls. Also, the wattage requirements of various customers may be met by supplying wholesale and retail dealers with a supply of standard model water heaters and a supply of heating elements of various heating capacities.

Another important feature of my invention is the arrangement of tubes 13 and 23 so as to achieve maximum heat transfer between the heating elements mounted therein and the water in the tank. Good heat transfer characteristics are provided by shaping the tubes so that the maximum area of the heating elements enclosed therein are in contact with the walls of the tubes and by providing the tubes with relatively large flat vertically disposed sides so as to increase the heated surface area and provide smooth water flow over the heat transfer surfaces. The increased surface in contact with the water has the further advantage that the desired water temperature can be maintained with a lower concentration of heat per unit area, which tends to reduce the formation of scale on the heating surfaces.

Still another feature of particular importance is the flexibility of the tube walls, which insures intimate thermal contact with the heating elements because the pressure of the water in the tank tends to make them conform to the adjacent surfaces of the heating elements. Moreover, this feature provides a means for removing scale accumulations from the heat transfer surfaces; scale on the flexible tube walls may be cracked off by removing the heating elements and manipulating the water inlet and outlet valves so as to alternately apply and remove pressure, thus flexing the tube walls.

While I have shown and described a specific embodiment of my invention, I do not desire my invention to be limited to the particular construction shown and described and I intend by the appended claims to cover all modifications within the true spirit and scope of my invention.

What I claim as new and desire to secure by Letters Patent of the United States is:

1. A water heater comprising a tank, a thin-walled tube having a closed end and an open end, means for supporting said tube in said tank with said open end projecting through an opening in said tank, and a fluid-tight joint between the tank wall and the said tube, said tube having flat vertically disposed side walls spaced to accommodate an elongated electric heating element therein, said side walls being flexible so that they are forced into intimate heat transfer relationship with said heating element by the pressure exerted by the water in the tank.

2. A water heater comprising an upright tank, a thin-walled tube of generally rectangular cross-section having a closed end and an open end, means for supporting said tube in said tank with said open end projecting through an opening in said tank, and a fluid-tight joint between the tank wall and said tube, said tube having flat vertically disposed side walls spaced and arranged to accommodate a pair of elongated electric heating elements lying in the same vertical plane within said tube, said side walls being flexible so that they are forced into intimate heat transfer relationship with said heating elements by the pressure exerted by the water in the tank.

3. A water heater comprising an upright tank, a thin-walled tube of generally rectangular cross section having a closed end and an open end, means for supporting said tube in said tank with said open end projecting through an opening in said tank, the pair of walls of said tube having the greatest area being substantially vertical, a fluid-tight joint between the tank wall and said tube, and a removable elongated electric heating element inside said tube, the walls of said tube being flexible so that they are forced into intimate heat transfer relationship with said heating element by the pressure exerted by the water in the tank.

4. A water heater comprising an upright tank, a thin-walled tube of elongated oval cross section having a closed end and an open end, means for supporting said tube in said tank with said open end projecting through an opening in said tank, and a fluid-tight joint between the tank wall and said tube, said tube having vertically disposed side walls spaced and arranged to accommodate a pair of elongated sheathed electric heating elements lying in the same vertical plane within said tube, said side walls being connected by a pair of curved wall portions spaced from each other a distance sufficient to provide a snug fit for said heating elements and having a curvature substantially equal to the curvature of the sheath of the heating elements, said side walls being flexible so that they are forced into intimate heat transfer relationship with said heating elements by the pressure exerted by the water in the tank.

5. A water heater comprising an upright tank, a pair of thin-walled metal tubes of elongated oval cross section each having a closed end and an open end, means including a flange member integral with the open end portion of each tube for supporting said tubes horizontally in said tank, said tubes extending through vertically spaced openings in the side wall of said tank, and a fluid-tight connection between each of said flange members and the adjacent portion of said tank wall whereby the interiors of said tubes are sealed from the interior of said tank while being accessible from the outside, each of said tubes having vertically disposed side walls spaced to accommodate a pair of removable U-shaped elongated sheathed electric heating elements lying in the same plane with one leg of each heating element in mutual contact, said side walls being connected by a pair of curved wall portions spaced from each other a distance sufficient to provide a snug fit for said heating elements and having a curvature substantially equal to the curvature of the sheath of the heating elements, said side walls being flexible so that they are forced into intimate heat transfer relationship with said heating elements by the pressure exerted by the water in the tank.

6. A water heater comprising a tank, a thin-walled tube having a closed end an an open end, means for supporting said tube in said tank with said open end projecting through an opening in said tank, said tube having a pair of generally flat oppositely disposed walls spaced to accommodate an electric heating element therein, said walls being flexible so that they are forced into intimate heat transfer relationship with said heating element by the pressure exerted by the water in said tank, and a fluid-tight joint between the tank and said tube.

7. A water heater comprising a tank, a tube having a closed end and open end, means for supporting said tube in said tank with said open end projecting through an opening in said tank, said tube having a pair of oppositely disposed walls spaced to accommodate an electric heating element therein, at least one of said walls being thin and flexible so that it is forced into intimate heat transfer relationship with said heating element by the pressure exerted by the water in said tank, and a fluid-tight joint between the tank and said tube.

References Cited in the file of this patent

UNITED STATES PATENTS

| | | |
|---|---|---|
| 1,336,559 | Gutzwiller | Apr. 13, 1920 |
| 1,689,915 | Endorf | Oct. 30, 1928 |
| 1,731,119 | Abbott et al. | Oct. 8, 1929 |
| 1,731,120 | Abbott | Oct. 8, 1929 |
| 1,985,831 | Hynes | Dec. 25, 1934 |
| 2,448,669 | Green, Jr. | Sept. 7, 1948 |